Sept. 19, 1939.  R. C. ROBERT  2,173,286
AUTOMATIC COUPLING FOR SEWING MACHINES
Filed Dec. 9, 1936  2 Sheets-Sheet 1
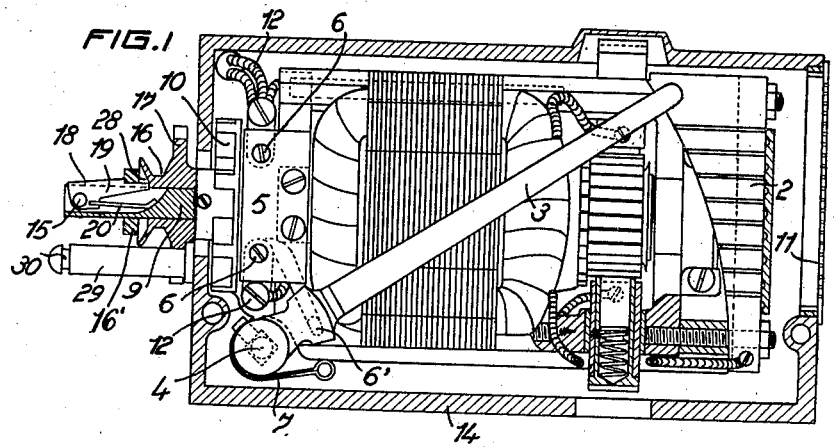
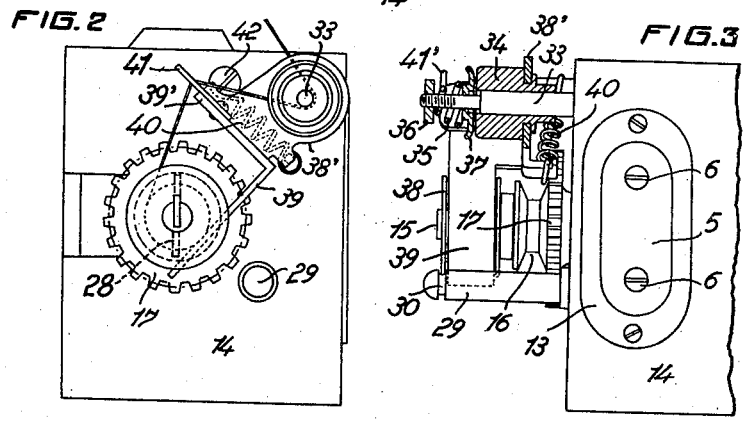
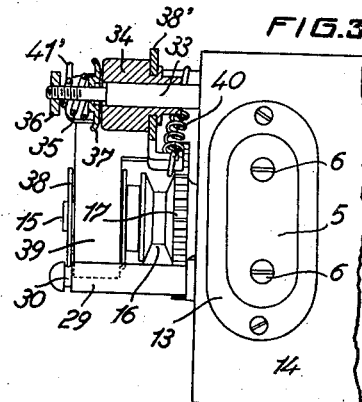
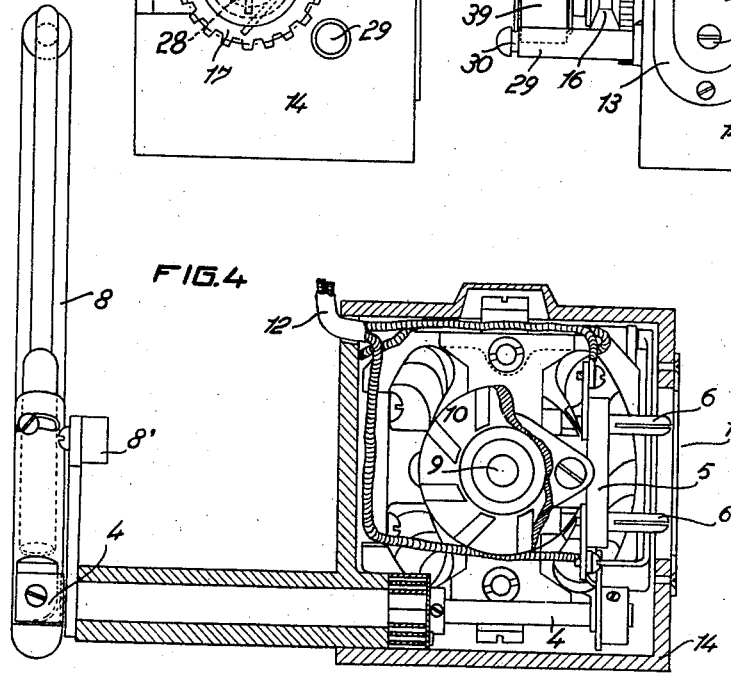
Inventor
R. C. Robert
by
W. E. Evans
Attorney.

Sept. 19, 1939.  R. C. ROBERT  2,173,286
AUTOMATIC COUPLING FOR SEWING MACHINES
Filed Dec. 9, 1936  2 Sheets-Sheet 2
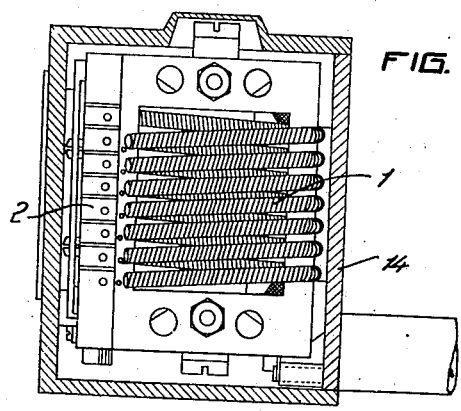
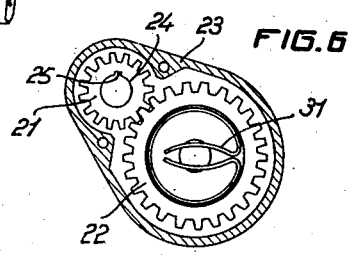
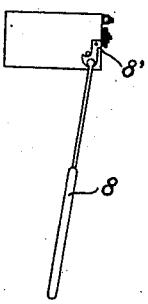
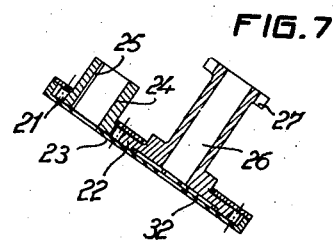
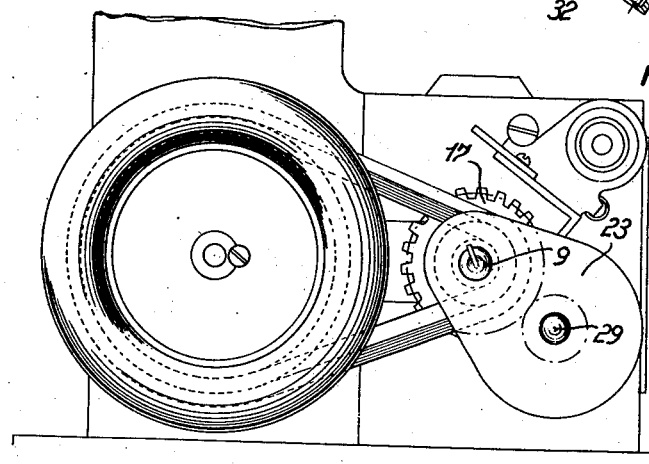
Inventor
R. C. Robert
by
W. E. Evans
Attorney.

Patented Sept. 19, 1939

2,173,286

UNITED STATES PATENT OFFICE 2,173,286

AUTOMATIC COUPLING FOR SEWING MACHINES

Ramòn Casas Robert, Barcelona, Spain

Application December 9, 1936, Serial No. 114,959
In France July 9, 1936

5 Claims. (Cl. 112—220)

The present invention relates to an automatic coupling for mounting on the driving shaft of a sewing machine, consisting of a key forced under the action of a spring to project from a groove provided in an extension of the shaft and to enter into a notch in the hub of the driving pulley or wheel of the machine. When an accessory with a cylindrical hub and provided with a notch is mounted on the said extension of the shaft, the key is depressed into the groove, but at the first turn and under the action of the spring it projects and comes to engage in the notch provided on the inside of the hub of the accessory part for securing the latter on the shaft, while the part of the key serving to act on the pulley remains lodged in the groove, either because it is of a less height at this part or because the shaft is of a greater diameter at the same part, so that the pulley remains disengaged and stationary during the whole time of operation of the accessory part. When the latter is withdrawn, the key is freed for introduction once more into the coupling notch of the pulley.

In order that the operation of the apparatus may be understood, one way of carrying out the invention is described, by way of example, with reference to the accompanying diagrammatic drawings, in connection with an automatic coupling for a sewing machine and with respect to two accessories adapted to be secured by the said coupling on the motor shaft: first, a shuttle bobbin filling device with an automatic thread-cutter that is operative at the end of the winding: and secondly, a speed reducing gear with four gear wheels of which the last forms part of the pulley, for indirect driving of the pulley of the machine with reduced speed, which is of advantage for certain kinds of work, such for example as embroidery.

Figure 1 is a sectional elevation of the electric motor and its parts, showing one form of automatic coupling on the shaft.

Figure 2 is a front view of the accessory bobbin device in place on the motor shaft and shows the pulley or driving wheel with which is integrally formed the fourth toothed wheel of the indirect reduced speed gearing.

Figure 3 is a part side elevation corresponding to Figure 2.

Figure 4 is a transverse section of the motor casing.

Figure 5 is a transverse section of the motor casing taken at a point where the resistances forming the motor rheostat are disposed.

Figure 6 is a sectional view of the removable speed reducing gear viewed from the front.

Figure 7 is an axial section of the reducing gear.

Figure 8 is an end view of the motor casing, showing a part of the sewing machine with the reducing gear complete and the bobbin support without the bobbin.

Figure 9 is a side view of the motor casing on a reduced scale, with the actuating lever of the rheostat fully extended.

In the electric motor represented in Figs. 1, 4, and 5, a rheostat is provided formed by the resistances 1 connected to the contacts 2 with which engage an arm 3 fixed on a spindle 4 from which it is insulated electrically and receiving current from the plug 5 by the spring contact 6'. The spindle 4 crosses the motor casing and tends to occupy an extreme angular position under the action of a spring 7. The spindle 4 carries, on the other face of the motor casing, a foldable arm (Figure 4) which can fold back upon the motor when the latter is not being used, while being able to take up the position indicated in Figure 9, which this arm is pointing downwardly is made extensible by a telescopic construction, so that it can thus be operated by the knee of the operator. Thus, by acting with the knee on this arm, the putting into operation and stopping of the motor is effected, with all the variations of speed that the work can require. The braking is effected by a small lever mounted on the same spindle 4 and carrying a brake shoe 8' acting upon the flywheel of the machine under the pressure of the spring 7 of the foldable arm 8 (Figure 4).

On the shaft 9 of the motor, is mounted a fan 10 (Figure 4) which provides a forced circulation of air around the motor to cool it. After having passed through the rheostat, this air escapes through a grating or grid 11 (Figure 1).

For the supply of current to the motor, there is provided on the longitudinal face of the latter, an insulated plug 5 (Figs. 3 and 4) from which issue also the leads 12 so that a lamp can be installed at some convenient spot. This current supply comprises, other than the single plug 5, two pins 6 on which is engaged a female member, which is made to fit in the opening 13 formed in the corresponding face of the motor casing 14.

As regards the motor itself, it is of such a construction that it can work with any current of suitable voltage. On the shaft 9 of the motor is mounted a grooved pulley 16 (Figs. 1, 2 and 3) which transmits the necessary movement to another pulley, itself mounted on the flywheel of a sewing-machine, as shown in Figs. 1, 2, 3 and 8. The grooved pulley 16 is formed integral with a gear wheel 17. The shaft 9 is formed with a groove 18 in which is housed a key 19 pivoted at 15, which is forced to project beyond the shaft 9 under the action of a spring 20.

When it is required to reduce the speed of the pulley 16, a speed reducing gear is fitted on the shaft 9. One such speed reducing gear is represented in Figs. 6 and 7 and comprises two toothed wheels 21 and 22 meshing with each other and mounted inside a gear case 23. The wheel 21 is formed with the hub 24, which is provided with a keyway 25. The wheel 22 is formed integral with the hub 26 which is integral with a pinion 27 of small diameter.

When the speed reducing gear is not in position on the shaft 9, the key 19 projects out of the groove under the action of the spring 20, and comes to engage in a diametrical slot or recess 28 which is provided in the part formed by the gear wheel 17 and the pulley 16, which is axially constrained upon the shaft 9 by the collar 16'. The movement of the shaft 9 of the motor is then transmitted to the pulley 16 and from the latter by means of a belt to the pulley of the machine.

If the hub 24 of the speed reducing gear is mounted on the end of the shaft of the motor with the hub 26 engaging over the fixed pin 29, to cause the pinion 27 to mesh with the wheel 17, the key 19 is depressed into the interior of the groove in the shaft 9 and leaves the slot or recess 28 of the pulley to enter, at the first turn of the motor, the keyway 25 provided in the hub 24 of the wheel 21. In order that this can be effected without the key again entering the recess 28 of the pulley, it is necessary that the part of the key within the pulley should have a smaller depth than the part within the hub 24 or that the shaft should be of greater diameter at the part within the pulley.

From this construction, it results that the device comprising the toothed wheel 17 and the pulley 16 remains idle on the shaft 9 and this shaft remains connected to the wheel 21 by the key 19 and the keyway 25. Thus the movement of the shaft 9 is transmitted to the belt by the hubs of the toothed wheels 21 and 22, the pinion 27 of small diameter and the toothed wheel 17 attached to the pulley 16.

On the fixed pin 29 is formed a groove 30 into which penetrates a spring 31 contained in the hollow 32 formed in the toothed wheel 22.

If, instead of the reducing gear, a bobbin is disposed on the shaft 9 and if it is provided with a keyway similar to that of the hub 24, the same operation is effected as of the said hub 24 of the reducing gear, so that the shaft turns only with the bobbin while it remains free with respect to the pulley 16. This point is interesting to note since while the motor is running to charge the bobbin with thread, the machine automatically ceases to function, which avoids the entanglements of the thread in the needle and in the shuttle if they were to be threaded by accident, while economising in the electric current needed for operation.

Parallel to the shaft 9 is provided a spindle 33 on which is mounted a sleeve 34 capable of moving and turning around the spindle, this sleeve tending to occupy an extreme position on the spindle under the action of a spring 35 situated between a nut 36 threaded on the end of the spindle 33 and a ring or small plate 37 which acts as a brake and as a stretcher. The spindle 33 has two sections of distinct diameters, the larger section carrying the sleeve 34 in such manner that when this sleeve moves longitudinally, as will be explained later, when the bobbin is full the ring 37 under the action of the spring 35 comes to bear against the shoulder formed on the spindle 33 and the thread is broken between the sharp edges of the shoulder of the spindle 33, present in the central cylindrical zone of the ring 37.

To the sleeve 34 is fixed a member in the form of a set-square of which one of the arms 39 is sufficiently wide to fit between the cheeks of the bobbin 38 to be filled and which thus bears against the thread wound on the bobbin by means of a spring 40 which acts on the member 38' in a suitable direction. The other arm 39' of this member 38' is provided at its upper end with a plate 41 of a suitable shape for guiding the thread of the bobbin of the shuttle coming from the stretcher 34, 37, this plate being provided at its ends with an indentation 41', so that the thread cannot jump out. The member 38' when it is in the position indicated in Figure 2, that is to say when it is in the position for the charging of the bobbin, bears in the direction of the spindle 33, against a stop 42; the shape and size of this stop and of the member 38' are such that, when the bobbin has received the full complement of thread, this member which, by reason of the increase in diameter of the winding against which the arm 39 bears, is then outside the bobbin, loses contact with the stop 42 and thus, freed from the restraint which had been put upon it, can move under the action of the spring 35 to break the thread automatically as has been hereinbefore described. The importance of this device for the automatic breaking of the thread will be noticed, since if it was not provided, then either by carelessness or an error in the time necessary for effecting the stoppage of the motor, the thread would accumulate outside the bobbin.

When the latter with its supply of thread has been withdrawn, the machine is again directly and automatically coupled with the motor.

I claim:

1. An accessory for sewing machines comprising an electric motor, a casing for the said electric motor, through the wall of which the shaft of the electric motor protrudes, a keyway in the said shaft, a key pivoted within the said keyway, a spring acting upon the said key to lift the key normally above the periphery of the shaft, a driving pulley rotatably mounted upon the said shaft, said driving pulley serving to operate a pulley upon the machine, the said driving pulley being locked to the said shaft by the key under the action of the spring, and the shaft and the key extending outwardly from the pulley to support and engage bobbins and like accessory mechanisms, the outwardly extending portion of the key being shaped so that when it is engaged and depressed by the accessory mechanism it disengages from the pulley while still engaging the accessory mechanism, and spindles disposed parallel with the motor shaft and serving for the reception of accessory mechanisms to be driven from the said motor shaft, the said accessory mechanisms being provided respectively with rotatable elements that are received upon the portion of the motor shaft extending beyond the driving pulley and are locked thereto by the key.

2. An accessory for sewing machines, according to claim 1, having spindles upon the casing of the motor disposed parallel with the motor shaft for the reception of accessory mechanisms to be driven from the said motor shaft, the said accessory mechanisms being provided respectively with rotatable elements that are received upon the portion of the motor shaft extending beyond the driving pulley and are locked thereto by the key, the key being provided of such shape that when the rotatable element of one of the accessory mechanisms is fitted upon the shaft and locked thereto by the key the key releases the pulley from the shaft and renders the said pulley inoperative.

3. An accessory for sewing machines according to claim 1, having upon the casing of the motor a spindle parallel with the motor shaft, a toothed wheel in fixed relation to the pulley and an accessory mechanism comprising a reducing gear consisting of two toothed wheels in fixed axial relation and a toothed wheel in engagement with one of the said wheels in fixed axial relation, a casing carrying the said reducing gear and maintaining the relationship of the wheels in engagement, the wheels in fixed axial relation having an axial bore to be received upon the spindle carried by the wall of the motor casing so that one of the said wheels engages with the wheel in fixed relation to the pulley and the wheel in engagement with one of the wheels in fixed axial relation being provided with a bore to be received upon the motor shaft, the said bore being provided with a keyway to engage the key of the motor shaft, the said key being of a form to release the pulley from the shaft when the wheel of the reducing gear is engaged thereon so that the pulley is driven from the motor shaft through the reducing gear.

4. An accessory for sewing machines comprising an electric motor, a casing for the said electric motor, through the wall of which the shaft of the electric motor protrudes, a keyway in the said shaft, a key pivoted within the said keyway, a spring acting upon the said key to lift the key normally above the periphery of the shaft, a driving pulley rotatably mounted upon the said shaft, said driving pulley serving to operate a pulley upon the machine, the said pulley being locked to the said shaft by the key under the action of the spring, a spindle upon the casing of the motor disposed parallel with the motor shaft, a bobbin for mounting upon the motor shaft, the said bobbin having the bore provided with a keyway to receive the key of the motor shaft, the key being of a form such that when the bobbin is mounted upon the motor shaft the pulley is disengaged from the motor shaft by retraction of the key, a thread-tensioning device mounted upon the spindle carried by the motor casing, and means in connection with the said thread-tensioning device for arresting the charging of the bobbin with thread when the bobbin is full.

5. An accessory for sewing machines, according to claim 4, wherein the thread-tensioning device comprises a sleeve-like element fitting upon the spindle, a bracket in fixed relation to the sleeve-like element, a control member having a portion to rest upon the thread being wound upon the spool and serving as the bobbin is filled to give to the sleeve-like element a limited angular movement about the spindle, a spring anchored to a stop member upon the wall of the casing and acting upon the bracket to oppose the movement of the control member, a spring acting upon the thread-tensioning device to tend to move it along the spindle, the stop member resisting such axial movement until the bobbin is full, and the spindle being provided of a form to sever the thread upon the axial movement of the sleeve member.

RAMON CASAS ROBERT.